US011868283B2

(12) United States Patent
Bertacco et al.

(10) Patent No.: US 11,868,283 B2
(45) Date of Patent: Jan. 9, 2024

(54) HYBRID ON/OFF-CHIP MEMORY ARCHITECTURE FOR GRAPH ANALYTICS

(71) Applicant: THE REGENTS OF THE UNIVERSITY OF MICHIGAN, Ann Arbor, MI (US)

(72) Inventors: Valeria Bertacco, Ann Arbor, MI (US); Abraham Addisie, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 473 days.

(21) Appl. No.: 16/932,183

(22) Filed: Jul. 17, 2020

(65) Prior Publication Data
US 2022/0019545 A1 Jan. 20, 2022

(51) Int. Cl.
*G06F 13/16* (2006.01)
*G06F 13/42* (2006.01)
(Continued)

(52) U.S. Cl.
CPC ........ *G06F 13/1668* (2013.01); *G06F 3/0655* (2013.01); *G06F 13/4027* (2013.01);
(Continued)

(58) Field of Classification Search
None
See application file for complete search history.

(56) References Cited

U.S. PATENT DOCUMENTS 8,959,292 B1 * 2/2015 Ahn ..................... G06F 9/3895
711/154
9,075,935 B2 * 7/2015 Vasudevan ............. G06F 30/00
(Continued)

FOREIGN PATENT DOCUMENTS

EP 3343359 A1 * 7/2018 ......... G06F 17/5045

OTHER PUBLICATIONS

Zhang et al, "Degree-aware Hybrid Graph Traversal on FPGA-HMC Platform", FPGA '18, Feb. 25-27, 2018, Monterey, CA, USA © 2018 Association for Computing Machinery. ACM ISBN 978-1-4503-5614-5/18/02 https://doi.org/10.1145/3174243.3174245, 10 pages.*

(Continued)

*Primary Examiner* — Uyen T Le
(74) *Attorney, Agent, or Firm* — Harness, Dickey & Pierce, P.L.C.

(57) ABSTRACT

The increased use of graph algorithms in diverse fields has highlighted their inefficiencies in current chip-multiprocessor (CMP) architectures, primarily due to their seemingly random-access patterns to off-chip memory. Here, a novel computer memory architecture is proposed that processes operations on vertex data in on-chip memory and off-chip memory. The hybrid computer memory architecture utilizes a vertex's degree as a proxy to determine whether to process related operations in on-memory or off-chip memory. The proposed computer memory architecture manages to provide up to 4.0× improvement in performance and 3.8× in energy benefits, compared to a baseline CMP, and up to a 2.0× performance boost over state-of-the-art specialized solutions.

15 Claims, 7 Drawing Sheets

(51) Int. Cl.
*G06F 13/40* (2006.01)
*G06F 16/955* (2019.01)
*G06F 16/901* (2019.01)
*G06F 3/06* (2006.01)

(52) U.S. Cl.
CPC ...... *G06F 13/4282* (2013.01); *G06F 16/9024* (2019.01); *G06F 16/9558* (2019.01)

(56) References Cited

U.S. PATENT DOCUMENTS

| | | | | | |
|---|---|---|---|---|---|
| 2013/0326294 | A1* | 12/2013 | Lo | ......................... | G11C 29/16 714/E11.169 |
| 2015/0269065 | A1* | 9/2015 | Bourd | ..................... | G06F 9/526 711/155 |
| 2016/0071233 | A1* | 3/2016 | Macko | .................. | G06T 11/206 345/440 |
| 2019/0004945 | A1* | 1/2019 | Fleming | .............. | G06F 12/0802 |
| 2019/0235915 | A1* | 8/2019 | Hakura | ................ | G06F 12/0855 |
| 2019/0258401 | A1* | 8/2019 | Li | ......................... | G06F 3/0604 |

OTHER PUBLICATIONS

Junwhan Ahn et al, "A Scalable Processing-in-Memory Accelerator for Parallel Graph Processing", ISCA'15, Jun. 13-17, 2015, Portland, OR, USA, © 2015 ACM. ISBN 978-1-4503-3402-0/15/06 DOI: http://dx.doi.org/10.1145/2749469.2750386, 13 pages.*

Shijie Zhou et al, "Accelerating Graph Analytics on CPU-FPGA Heterogeneous Platform", 2017 29th International Symposium on Computer Architecture and High Performance Computing, 978-1-5090-1233-6/17 © 2017 IEEE. DOI 10.1109/SBAC-PAD.2017.25, 8 pages.*

Junwhan Ahn et al, "PIM-Enabled Instructions: A Low-Overhead, Locality-Aware Processing-in-Memory Architecture", ISCA'J5, Jun. 13-17, 2015, Portland, OR, USA© 20 15 ACM. ISBN 978-1-4503-3402-0/15/06 http://dx.doi.org/l0.1145/2749469.2750385, 13 pages.*

Yan, Mingyu, et al. "Alleviating irregularity in graph analytics acceleration: A hardware/software co-design approach." Proceedings of the 52nd Annual IEEE/ACM International Symposium on Microarchitecture. 2019. 14 pages. (Year: 2019).*

Addisie, Abraham, Hiwot Kassa, Opeoluwa Matthews, and Valeria Bertacco. "Heterogeneous memory subsystem for natural graph analytics." In 2018 IEEE International Symposium on Workload Characterization (IISWC), pp. 134-145. IEEE, 2018, (Year: 2018).*

Lei, Y., Dou, Y., Guo, L., Xu, J., Zhou, J., Dong, Y., & Li, H. (2013). VLIW coprocessor for IEEE-754 quadruple-precision elementary functions. ACM Transactions on Architecture and Code Optimization (TACO), 10(3), 1-22. (Year: 2013).*

Blake, Geoffrey, Ronald G. Dreslinski, and Trevor Mudge. "A survey of multicore processors." IEEE Signal Processing Magazine 26.6 (2009): 26-37 (Year: 2009).*

A. Addisie et al."Heterogeneous Memory Subsystem for Natural Graph Analytics" IISWC (2018).

Tae Jun Ham et al."Graphicionado: A High-Performance and Energy-Efficient Accelerator for Graph Analytics", The 49th Annual IEEE/ACM International Symposium on Microarchitecture, Article No. 56, pp. 1—13 (2016).

Junwhan Ahn et al. "A Scalable Processing-in-Memory Accelerator for Parallel Graph Processing", ISCA'15 (2015).

Lifeng Nai et al."GraphPIM: Enabling Instruction-Level PIM Offloading in Graph Computing Frameworks", 2017 IEEE International Symposium on High Performance Computer Architecture (2017).

* cited by examiner

| for V in vertices<br>  next_rank[V] = 0;<br>for V in vertices<br>  curr_rank[V] = 1/numVertices; | //Initialization phase |
| --- | --- |
| for V in vertices<br>  for edge(V,U) in outGoingEdges[V]<br>    next_rank[U] += curr_rank[V]/outDegree[V]; | //Update phase |
| for V in vertices<br>  curr_rank[V] = c*next_rank[V] + (1-c)/numVertices; | //Apply phase |

```
for V in vertices
   for edge(V,U) in outGoingEdges[V]
      *vertex_ID = U;
      *src_data = curr_rank[V]/outDegree[V];
```

HYBRID ON/OFF-CHIP MEMORY ARCHITECTURE FOR GRAPH ANALYTICS

GOVERNMENT CLAUSE

This invention was made with government support under Agreement No. HR0011-18-3-0004 awarded by The Defense Advanced Research Projects Agency (DARPA). The Government has certain rights in the invention.

FIELD

The present disclosure relates to a hybrid in on/off-chip memory architecture for graph analytics.

BACKGROUND

Graph algorithms are deployed in a wide range of applications to solve contemporary problems. For instance, they enable search engines, such as Google, to calculate the popularity of web pages; online ride-hailing services to select optimal routes; medical centers to analyze brain functional connectivity; and governments to trace the transmission of viruses through recorded human contacts. However, their adoption in current computing hardware systems has been hindered by their poor performance and energy inefficiency. Recently, several single-node multicore solutions have been proposed which distribute the execution of graph algorithms across multiple cores operating in parallel, while updating critical shared data atomically (referred to as 'atomic operations'). The benefits of these solutions are limited, primarily due to the inefficient computation of atomic operations by the cores, as their computation must be stalled through the completion of each atomic operation, and the high traffic generated between cores and off-chip memory, because of irregular-access patterns, which are typical of graph-based algorithms. To address these limitations, recent solutions based on processing in off-chip memory have been widely embraced. These solutions offload the computation of atomic operations from general-purpose cores to lightweight compute engines, co-located with off-chip memory, thus reducing the computational impact of atomic operations on the cores, as well as the traffic between cores and off-chip memory. However, these solutions generate high traffic between the compute engines and off-chip memory, as each offloaded operation triggers two memory requests (a read and a write) at a cache line granularity, from the compute engine to its associated memory partition.

More recently, other solutions, based on processing in on-chip memory, have been proposed. These solutions offload the computation of atomic operations from the cores to lightweight compute engines, this time co-located with on-chip, rather than off-chip, memory units, thus exploiting the temporal locality that exists in many graphs due to the presence of a small number of highly connected vertices. These solutions eliminate the traffic between compute engines and their local memory partitions, which was a key bandwidth available to the cores for other requests, such as edge-data requests. In addition, they reduce per-access latency and energy consumption of off-chip memory. However, these solutions face two limitations. First, they are sub-optimal for graphs with uniform per-vertex edge count, as such graphs have limited opportunities for temporal locality in vertex access. Second, they do not offer efficient computation of atomic operations for graphs with sparsely-connected vertices, limiting the overall performance benefit.

This section provides background information related to the present disclosure which is not necessarily prior art.

SUMMARY

This section provides a general summary of the disclosure, and is not a comprehensive disclosure of its full scope or all of its features.

A computer memory architecture suitable for analyzing a graph is presented. The computer memory architecture includes a plurality of computer processor nodes interconnected together and one or more off-chip memories accessible to the plurality of computer processor nodes. The plurality of computer processor nodes reside on a single microchip. Data related to high-degree vertices of a graph is stored in the memories of the plurality of computer processor nodes and data related to low-degree vertices of the graph is stored in the one or more off-chip memories, where the high-degree vertices are a subset of vertices in the graph and the low-degree vertices are the remainder of vertices in the graph, such that the high-degree vertices have more edges than the low-degree vertices. Atomic operations pertaining to update of the high-degree vertices are performed by an atomic operations computer unit associated with the respective computer processor node where the data related the high-degree vertices is stored, and atomic operations pertaining to update of the low-degree vertices are performed by an atomic operations computer unit on a respective off-chip memory where the data related to the low-degree vertices is stored.

High-degree vertices are preferably chosen from the graph such that data related to the high-degree vertices fits in space of the memory on the plurality of computer processor nodes.

In one example embodiment, each of the computer processor nodes includes a core processor, a cache memory, a secondary memory, and an atomic operations compute unit, where data related to high-degree vertices is stored in the secondary memory and the atomic operations pertaining to said data is performed by the atomic operations computer unit. Each of the computer processor nodes further includes an on-chip vertex management unit interfaced with the core processor, the cache memory, the secondary memory, the atomic compute unit and the off-chip memories, wherein the on-chip vertex management unit is configured to receive data requests and route the data requests to one of the secondary memory or one of the off-chip memories. The on-chip vertex management unit updates a list of vertices in accordance with a graph algorithm, where the vertices in the list of vertices are active in next iteration of the graph algorithm.

An off-chip memory may include multiple memory modules. Each memory module includes an atomic operations compute unit, a memory controller, and a memory, wherein data related to low-degree vertices is stored in the memory and the atomic operations pertaining to said data is performed by the atomic operations computer unit. Each memory module further includes an off-chip vertex management unit configured to receive data requests from the computer processor nodes and manages the atomic operations embodied in the data requests.

In one example, the vertices in the graph represent web pages and edges in the graph represent hyperlinks.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figures 1, 2:
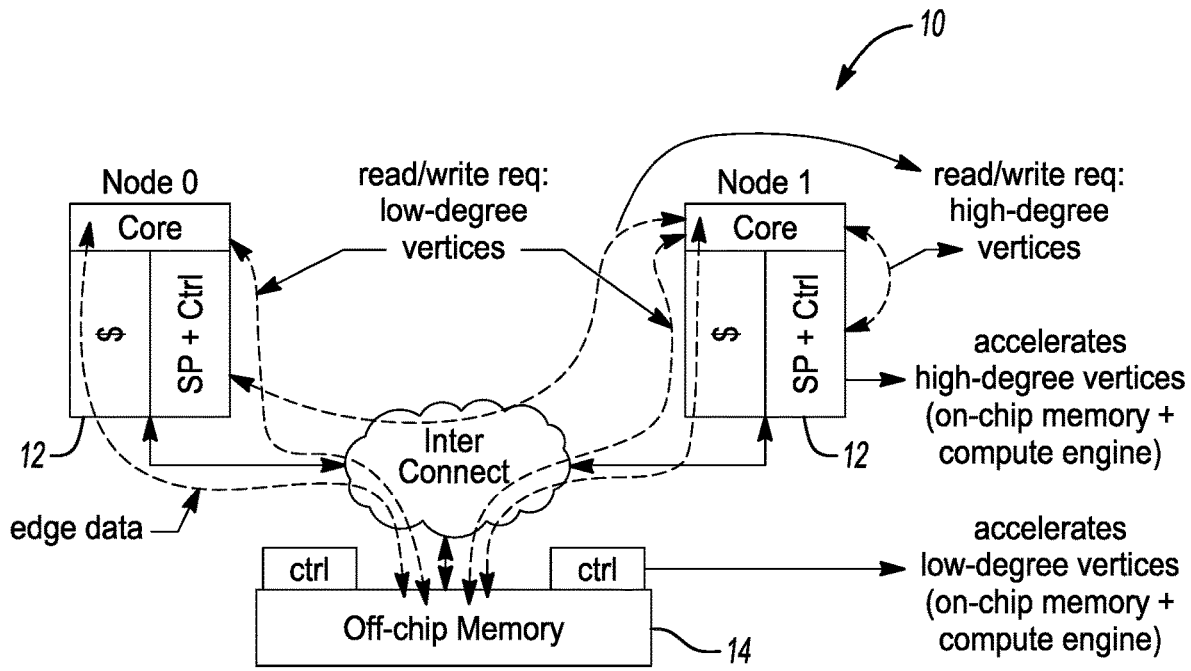
FIG. 1 is a diagram of a proposed hybrid computer memory architecture.
FIG. 2 is a table showing pseudo-code for one iteration of the PageRank graph algorithm.

FIG. 1 illustrates a hybrid computer memory architecture 10 suitable for analyzing graphs. The hybrid computer memory architecture 10 is comprised of a plurality of computer processor nodes 12 and one or more off-chip memories 14. The plurality of computer processor nodes 12 are interconnected and reside on the same microchip (i.e., integrated circuit). In an example embodiment, the one or more off-chip memories 14 are connected via a serial communication link to the plurality of computer processor nodes 12.

Frequently accessed vertex data from a graph is stored in on-chip memory; whereas, less frequently accessed vertex data from the graph is stored in off-chip memory. That is, data related to high-degree vertices of a graph are stored in memory on the computer processor nodes and data related to low-degree vertices of the graph are stored in the one or more off-chip memories, such that the high-degree vertices are a subset of vertices in the graph and the low-degree vertices are the remainder of vertices in the graph and the high-degree vertices have more edges than the low-degree vertices. In one example, vertices in the graph are ordered in descending order from vertices with most number of edges to vertices with least number of edges. A subset of the vertices having the most number of edges is then selected to be the high-degree vertices. The high degree vertices are preferably chosen such that data related to the high-degree vertices fits in memory space available on the plurality of computer processor nodes. For power-law graphs with imbalanced connectivity among vertices, vertices in the subset of vertices is connected to approximately eighty (80) percent of the edges in the graph. Lightweight compute engines, attached to each memory unit, executes the related operations in-situ as further described below. Note that both the general-purpose cores and the lightweight compute engines must access vertex data. To simplify the implementation of cache coherence, the architecture employs a cache-bypassing technique for vertex-data requests from the cores. In contrast, edge data is retrieved via caches, as those accesses are still issued by the cores and exhibit high cache-locality.

By way of background, a graph comprises a set of vertices, which are connected by edges. For instance, in a representation of the world wide web, vertices could represent web pages and edges represent hyperlinks. Graphs are commonly processed by graph algorithms. An example of a graph algorithm is PageRank, which computes, for each web page, the sum of the ranks (e.g., popularity) of all of its neighboring web pages and then uses this value to compute the new rank of the web page. FIG. 2 provides pseudo-code for PageRank: it starts by initializing the current (curr rank) and next (next rank) rank values. It then iterates through all the outgoing edges of each source vertex (outGoingEdge) to find all the destination vertices. Following this, it reads the rank (curr rank) and degree (outDegree) of the source vertex and accrues the new rank value (next rank) at the destination vertices. Finally, it updates next rank by performing a user-defined apply function. Note that, due to the structure of the algorithm and graph data layout, typical accesses made by cores to the outGoingEdge, curr rank, and outDegree data structures exhibit good cache locality. The same holds true for accesses to the next rank data structure, but only during the initialization and apply phases. In contrast, accesses to next rank often exhibit poor locality during the update phase, and these updates are typically carried out atomically in multicore architectures, incurring high performance overheads. Many recent studies strive to optimize atomic operations. For example, GraphPIM offloads all atomic operations to off-chip memory, and OMEGA executes atomic operations related to high-degree vertices in dedicated on-chip memory. Note that neither approach holistically optimizes across various vertex's degree, or graph characteristics, such as those that follow the power law or uniform graphs.

To estimate the potential benefit of the proposed computer memory architecture over GraphPIM and OMEGA, an experiment was performed using the gem5 simulation infrastructure. Both GraphPIM and OMEGA were modeled in gem5 and ran the PageRank algorithm with several input graphs of varying average degrees. The findings indicate that OMEGA executes up to 26% of atomic operations on general-purpose cores when processing power-law graphs, and up to 80% when processing relatively uniform graphs. Unfortunately, the execution of atomic operations on general-purpose cores incurs a high-performance cost, primarily due to the suspension of the cores' pipelines during the operation's execution. GraphPIM attempts to overcome this cost by executing all atomic operations in off-chip memory, but it also generates high traffic between compute engines and their local memory partitions: up to 6× the traffic generated by a plain chip multi-processor (CMP) solution.

Indeed, the execution of each atomic operation on Graph-PIM entails two memory requests (a read and a write) from the compute engines. In contrast, the proposed solution processes atomic operations both in on-chip and off-chip memory, thus reducing this additional traffic.

Figure 3:
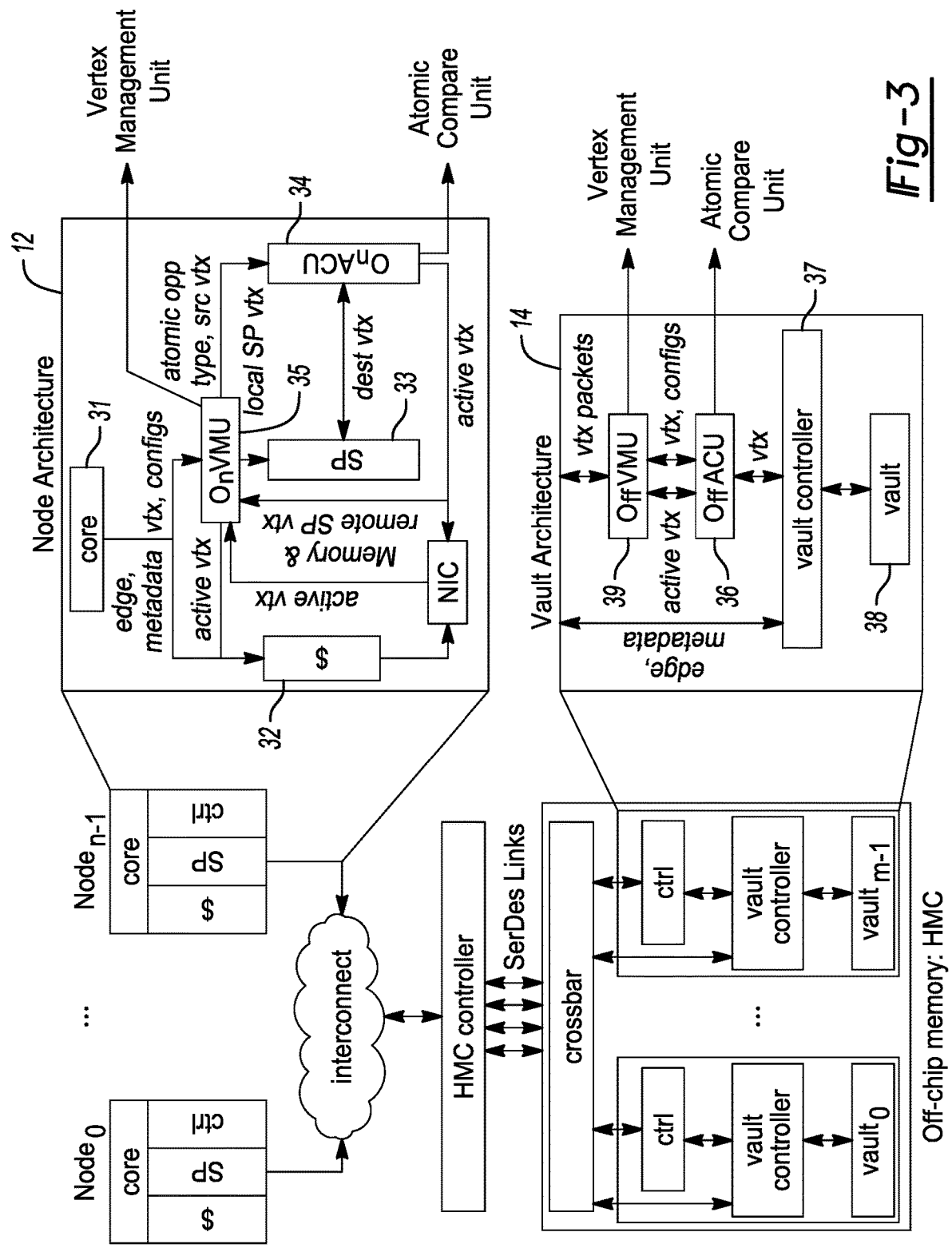
FIG. 3 is a diagram further depicting the proposed computer memory architecture.

FIG. 3 further depicts the proposed hybrid computer memory architecture 10. Each of the computer processor nodes 12 includes a core processor 31, a cache memory 32, a secondary memory 33, and an atomic compute unit 34. In one example embodiment, the secondary memory 33 is modeled as a specialized scratchpad architecture. Again, data related to high-degree vertices is stored in the secondary memory 33 and the atomic operations pertaining to said data is performed by the atomic computer unit 34.

Each of the computer processor node 12 also includes an on-chip vertex management unit 35. The vertex management unit 35 is interfaced with the core processor 31, the cache memory 32, the secondary memory 33, and the atomic compute unit 34. The on-chip vertex management unit 35 is configured to receive data requests and manages the atomic operations, including routing the data requests to one of the secondary memory or one of the off-chip memories.

The off-chip memory 14 may include multiple partitions or memory modules connected to a crossbar. Each memory module includes an atomic compute unit 36, a memory controller 37, and a memory 38, such that data related to low-degree vertices is stored in the memory 38 and the atomic operations pertaining to said data is performed by the atomic computer unit 36. Each memory module further includes an off-chip vertex management unit 39. The off-chip vertex management unit 39 is configured to receive data requests from the computer processor nodes and manages the atomic operations embodied in the data requests.

In an example embodiment, the on-chip secondary memory 33 is modeled as a specialized scratchpad (SP) architecture; whereas, the off-chip memory 38 is modeled as a Hybrid Memory Cube (HMC). A Hybrid Memory Cube memory is a 3D-stacked memory solution that has been shown to provide higher bandwidth to memory compared to conventional solutions, such as DDR. The HMC includes 32 DRAM partitions (vaults), which are connected to the processor cores via four high-speed SerDes links. The ACUs 34, 36 at both scratchpads and vaults are specialized hardware units that execute the atomic operations of a wide range of graph algorithms, similar to those detailed in the HMC 2.0 specification which is described by L. Nai et al in "Graph-PIM: Enabling instruction-level PIM offloading in graph computing frameworks" in Proceedings HPCA, 2017 and is incorporated herein by reference.

During operation, the on-chip Vertex Management Units ($O_n$VMUs) filter requests to vertex data, manage their execution, and forward the results to their destination. The destination $O_n$VMUs control the execution of the requests on the $O_n$ACUs and/or the scratchpads. In addition, the $O_n$VMUs update the activeList on behalf of their local cores, based on the results of atomic operations obtained from the ACUs. activeList refers to a list of vertices that will be active, and thus processed, in the next iteration of a graph algorithm. The off-chip Vertex Management Units ($O_{ff}$VMUs) manage the execution of requests related to low-degree vertices. Additionally, similar to ACUs, the cores issue read/write requests to the vertex data, e.g., to initialize the vertex data and to access source-vertex data for generating atomic commands to ACUs. All of these requests bypass the conventional cache hierarchies to simplify coherence management between the cores and the ACUs; this is accomplished by leveraging a cache bypassing technique common in commercial processors. This approach also reduces cache pollution, access latency, and energy costs. However, edge data and metadata are still delivered via the conventional cache hierarchy, as they are accessed only by the cores and maintain high locality.

To minimize the traffic between cores and off-chip memory, and thus reduce the associated bandwidth, latency, and energy costs, the proposed computer memory architecture 10 utilizes dedicated on-chip memory units to store high-degree vertices, partitioning them across the multiple units. The on-chip memory is modeled as a scratchpad (SP), organized as a direct-mapped memory, storing data related to high-degree vertices. Each entry in the scratchpad corresponds to the data that the algorithm stores per-vertex. In most graph algorithms, this per-vertex data ranges from 4 to 12 bytes (see Table I). For instance, PageRank stores 8 bytes of rank values for each vertex.

TABLE I

Graph algorithms and their characteristics.

| Name | op type | entrySize | activeList | % atomic op | % rand. access |
|------|---------|-----------|------------|-------------|----------------|
| PR | FP add | 8 | no | high | high |
| BFS | int comp | 4 | yes | low | high |
| SSSP | int min | 4 | yes | high | high |
| Radii | int comp | 12 | yes | high | high |
| CC | int comp | 8 | yes | high | high |
| BC | FP add | 8 | yes | high | high |
| KC | Int add | 4 | yes | low | low |
| TC | int add | 4 | yes | low | low |

Figure 4:
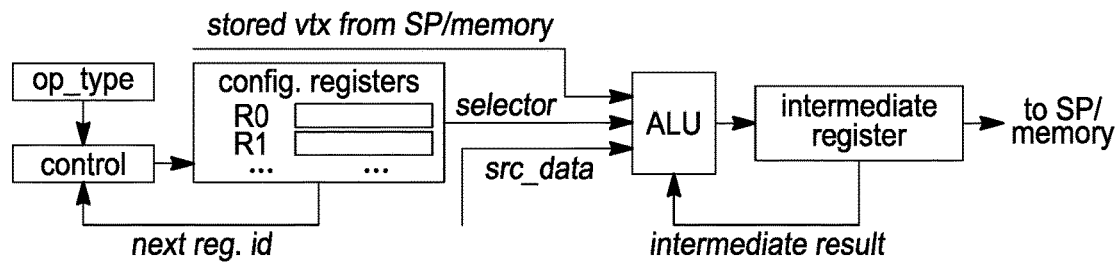
FIG. 4 is a diagram showing an example implementation for an Atomic Compute Unit (ACU) suitable for use in the proposed computer memory architecture.

To execute the atomic operations entailed by graph algorithms in-situ, thus eliminating the computation overhead of atomic operations from the general-purpose cores, the proposed computer memory architecture co-locates atomic compute units with both scratchpads and off-chip memory. FIG. 4 depicts an example architecture for an atomic compute unit (ACU) 34, 36. Each ACU uses configuration registers to store the set of micro-operations that implement the required atomic operation. The control logic takes the atomic operation type (op type) as input to index the configuration registers, and then executes the corresponding micro-operation. Other inputs to the ACUs include source-vertex data (src data) from the cores and stored data from either scratchpads or off-chip memory, depending on where the ACU is deployed. The proposed computer memory architecture configures the configuration registers during the application's initialization. New algorithms requiring new types of atomic operations can also be supported by generating additional micro-operation sequences.

Figure 5:
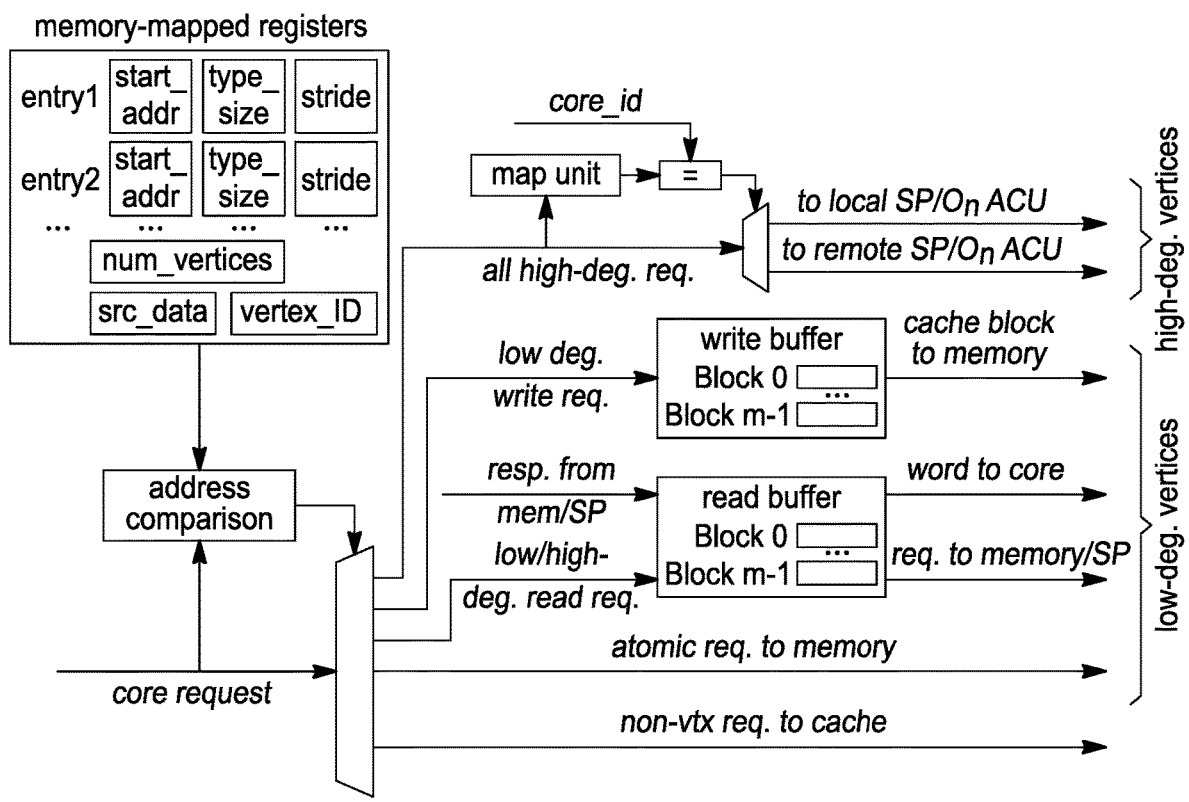
FIG. 5 is a diagram showing an example implementation of an On-chip Vertex Management Unit ($O_n$VMU) suitable for use in the proposed computer memory architecture.

Requests related to atomic operations, e.g., a write request to the src data memory-mapped register (discussed below), are handled differently: requests related to low-degree vertices are forwarded to off-chip memory, while those related to high-degree vertices are sent to the destination scratchpad. The destination $O_n$VMU holds the incoming request in a buffer and generates a read request to its associated scratchpad to retrieve the requested value. Upon receiving the value, the destination $O_n$VMU initiates execution of the atomic operation on the associated $O_n$ACU. Then, the $O_n$VMU writes the result back to its scratchpad and, if the operation generates a new active vertex, it sends also a command with active-vertex information to the originating $O_n$VMU. Upon receiving the command, the originating $O_n$VMU updates its activeList in the cache. This selection process and compute flow for the originating $O_n$VMU is further shown in FIG. 5.

Figures 6, 7:
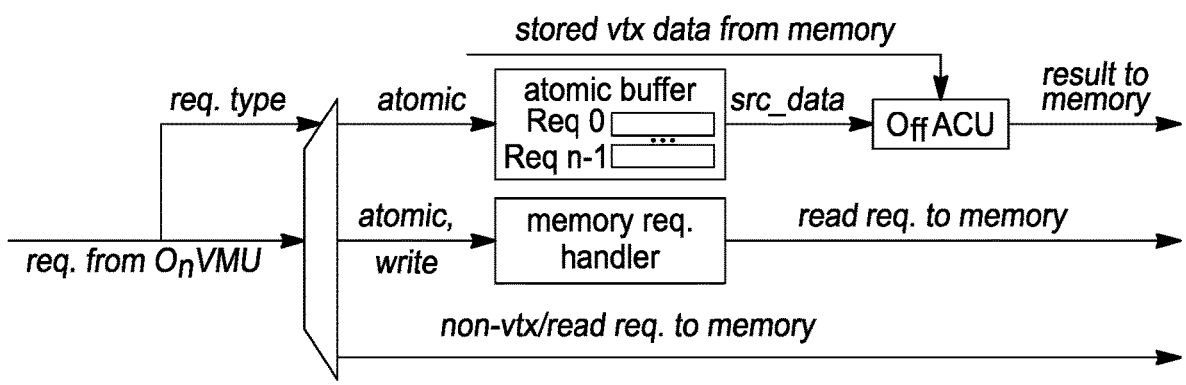
FIG. 6 is a diagram showing an example implementation of an Off-Chip Vertex Management Unit ($O_{ff}$VMU) suitable for use in the proposed computer memory architecture.
FIG. 7 shows pseudo-code for an update phase of the PageRank graph algorithm.

Low-degree vertex accesses filtered by the $O_n$VMUs are forwarded to the $O_{ff}$VMUs via the memory controller. The memory controller inspects the request address and sends it to the corresponding memory partition (vault). The $O_{ff}$VMU connected to this vault is thus tasked with processing the request, as shown in FIG. 6. First, this $O_{ff}$VMU determines whether the request is atomic or a simple read/write request to vertex data. For atomic requests, the $O_{ff}$VMU generates a read request to memory, while queuing the request in the atomic buffer. Upon receiving a response from memory, the $O_{ff}$VMU instructs the corresponding $O_{ff}$ACU to dequeue the request and execute the atomic operation. Once the $O_{ff}$ACU completes its task, the $O_{ff}$VMU writes the result back into memory. If the atomic operation generates an active vertex, the $O_{ff}$VMU forwards a command to the originating $O_n$VMU to update its corresponding activeList in the cache. For non-atomic requests, the $O_{ff}$VMU reads the corresponding cache block from memory and sends its to the originating $O_n$VMU (read operations), or it reads, updates, and writes-back the block to memory (write operations).

For power-law graphs that do not fit in the on-chip memory, the proposed computer memory architecture must identify high-degree vertices to maximize the utilization of on-chip memory, and thus provide higher performance benefit. To do so, either of the following two approaches can be adopted. The first is a hardware-based vertex replacement policy that maintains the frequency of atomic operations computed on each vertex. In this approach, the proposed computer memory architecture maintains frequency and collision bits for each vertex stored in the on-chip memory, while increasing the associated frequency value if an atomic operation is computed on the vertex successfully, or otherwise increasing the corresponding collision value. For each new request, if the stored frequency value is greater than that of the collision value, the stored value will be replaced by the new one and sent to off-chip memory; otherwise, the new value will be the one forwarded to off-chip memory. This approach is similar to that employed in A. Addisie et al "Collaborative accelerators for in-memory mapreduce on scale-up machines", Proc. ASP-DAC, 2019, where its main drawback is that it requires maintaining extra bits to implement the replacement policy.

The second solution is a software-based graph preprocessing approach that reorders vertices based on their in-degree. Once vertices are reordered, the high degree vertices can be identified by verifying if the ID of a new vertex request is smaller than the maximum number of vertices that can be mapped to the on-chip memory unit, assuming that the highest-degree vertex has an ID of 0. Although this approach can identify the optimal set of high-degree vertices at no extra hardware cost, it entails a preprocessing overhead. Such overhead could be alleviated by reordering only vertices to be mapped to on-chip memory. In power-law graphs, approximately 20% of the vertices account for 80% of the connectivity; thus, sorting only 20% of the vertices would allow to compute a significant fraction of atomic operations in on-chip memory. Furthermore, the cost of this reordering algorithm is amortized over the execution of various graph algorithms, repetitive execution of a same algorithm, or even the many iterations of a single execution of the algorithm on a same dataset.

To simplify the implementation of cache coherence, the proposed computer memory architecture relies on uncacheable address space for vertex data: all accesses to vertex data bypass caches, avoiding the need to maintain coherence across caches, scratchpads, and off-chip memory. The proposed computer memory architecture utilizes the cores' translation look-aside buffer (TLB) to translate virtual to physical addresses when the $O_n$VMUs update the activeList in the cache. Context switching is supported by saving the vertex data stored in scratchpads as part of the process's context. Other functionalities, such as thread scheduling, are independent of the proposed computer memory architecture's architecture and are performed as in a traditional CMP.

To enable a seamless integration of the proposed computer memory architecture with graph-software frameworks, such as those described by J. Shun et al in "Ligra: a lightweight graph processing framework for shared memory" in ACM Sigplan Notices, 2013, and by N. Sundaram et al in "GraphMat: High performance graph analytics made productive" Proc. VLDB, 2015, this disclosure strove to minimize system-level facing changes. Indeed, in the proposed computer memory architecture, it is sufficient to annotate atomic operations described earlier, a task that can be accomplished by a simple source-to-source transformation tool. For instance, FIG. 7 shows the proposed computer memory architecture-ready version of the update phase in PageRank: the atomic operation is translated into two write operations: one to the vertex-ID memory-mapped register, the other to the src data memory-mapped register. These operations are received by the $O_n$VMUs: the first passes the ID of the target vertex for the atomic operation, and the second the corresponding new rank value. The transformation tool should also augment the software frameworks with code to pass configuration parameters from the cores, such as atomic operation type, base and range of vertex data locations, etc. Other aspects of these software frameworks, including multi-threading, load balancing, etc., remain unchanged and are independent of the proposed computer memory architecture.

Although the connectivity of vertices in dynamic graphs changes overtime, the proposed computer memory architecture continues to provide performance benefit, as existing popular vertices tend to remain popular for a while, due to a characteristic called "preferential attachment". However, after a considerable amount of time, a large portion of the vertices stored in off-chip memory might become more popular than those in on-chip memory, in which case, the graph's vertices should be reordered periodically for optimal benefits. Alternatively, a hardware-based vertex replacement strategy, as discussed earlier, or a dynamic graph partitioning technique can be employed at the cost of a small hardware overhead.

While the proposed computer memory architecture specifically targets graph analytics, it is envisioned that it can be deployed in other application domains, such as MapReduce and database queries. For instance, in MapReduce, the word-count application determines the frequency of words in a document, which has been found to follow Zipf's law, that is, 20% of the words occur 80% of the time. The proposed computer memory architecture can take advantage of such skews in word occurrences by processing high-frequency words in the on-chip memory, and the remaining ones in off-chip memory.

While using scratchpads as on-chip memory leads to high performance benefits, it also entails high design costs. To alleviate these costs, a portion of the caches can be re-purposed to operate as scratchpads, using a technique similar to Intel's Cache Allocation Technology (CAT). For off-chip memory implementations, the proposed computer memory architecture is not limited to a HMC design; it can also leverage other architectures, such as High Bandwidth Memory.

To evaluate the proposed computer memory architecture, it is compared to a chip multi-processor (CMP) solution and two state-of-the-art proposals: GraphPIM, a processing-in-memory solution, and OMEGA, which leverages scratchpads with associated compute units. All of these solutions along with the proposed computer memory architecture was modeled in a gem5 simulator. The CMP has 16, 2 GHz, 8-wide, O3 cores running the x86 ISA, 32 KB L1 instruction and data caches, and 16 MB of shared L2 cache. The off-chip memory for all of the above solutions is based on HMC, which includes 8 GB of memory partitioned over 32 vaults, each vault providing a peak bandwidth of 20 GB/s. The scratchpads, $O_n$ACUs, and $O_n$VMUs are modeled by extending gem5's cache implementation; whereas, the $O_{ff}$ACUs and $O_{ff}$VMUs are modeled by extending gem5's HMC model. Half of the shared L2 cache are re-purposed as scratchpads for the proposed computer memory architecture and OMEGA, while keeping the L2 cache intact for CMP and GraphPIM. Finally, Ligra, a highly optimized software graph framework, is mapped to the simulator through the "m5threads" library, and ran the simulations in "syscall" emulation mode.

Characteristics of the graph algorithms evaluated are reported in Table I. PageRank (PR) calculates the popularity of vertices (web pages). Breadth-First Search (BFS) performs breadth-first traversal. Single-Source Shortest-Path (SSSP) computes the minimum distance from a source vertex to others. Radii estimates the maximum radius of a graph. Connected Components (CC) finds all independent subgraphs. Betweenness Centrality (BC) computes the number of shortest paths that go through each vertex. k-core (KC) identifies a maximum-size connected subgraph, comprising only vertices of degree ≥k. Triangle Counting (TC) computes the number of vertices that have two adjacent vertices that are also adjacent to each other. Five medium-to-large real-world graph datasets were used as inputs to each algorithm, except for SSSP, TC, and KC for which we used only the smallest datasets among those, due to their long simulation time. Table II presents the characteristics of all our datasets. Note that all datasets were sorted by decreasing vertex degree, and the sorted datasets were used in evaluating all three solutions considered.

TABLE II

Graph datasets characteristics.

| Name | Ref. | #Vtx | #Edge | Avg deg | Power law |
|---|---|---|---|---|---|
| lj: ljournal-2008 | [3] | 5.4M | 79.0M | 14.6 | yes |
| wiki: enwiki-2013 | [3] | 4.2M | 101.4M | 24 | yes |
| sd: soc-Slashdot0811 | [11] | 77K | 0.9M | 11.7 | yes |
| wUSA: Western-USA road | [5] | 6.2M | 15M | 2.4 | no |
| CA: roadNet-CA | [11] | 2.0M | 2.8M | 1.4 | no |
| PA: roadNet-PA | [11] | 1.1M | 1.5M | 1.4 | no |

Figure 8:
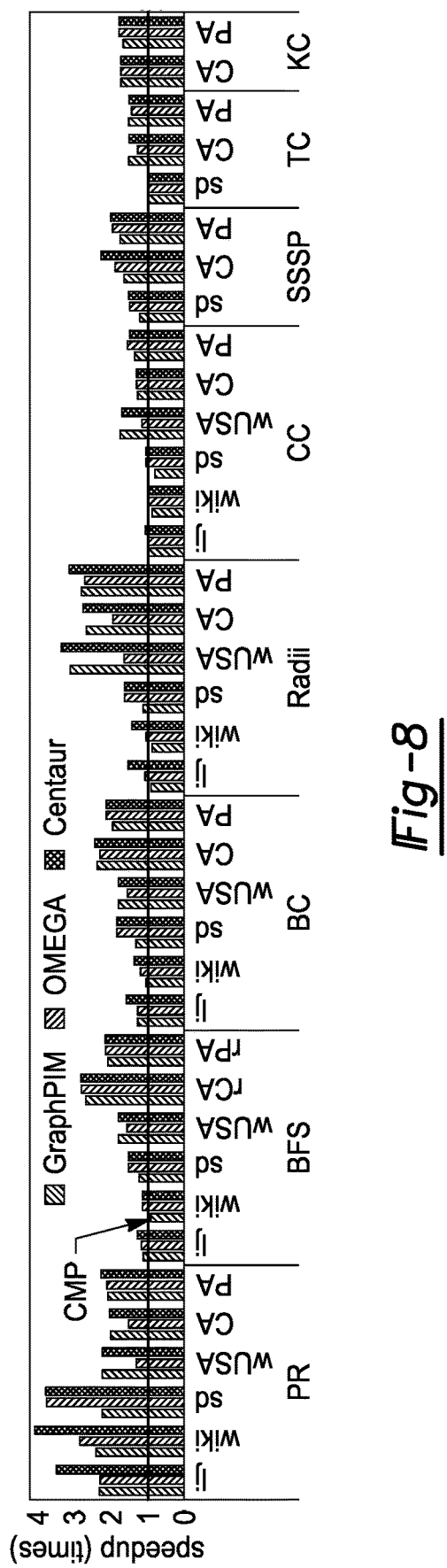
FIG. 8 is a graph showing performance comparison of the different memory architectures for select graph algorithms.

FIG. 8 compares the proposed computer memory architecture's performance against the other solutions. As shown, the proposed computer memory architecture delivers up to 4.0× speedup over the CMP reference, up to 1.7× over GraphPIM, and up to 2× over OMEGA. Note that GraphPIM excels on graphs with low-degree vertices, whereas OMEGA performs best on graphs with average high-degree. However, the proposed computer memory architecture consistently delivers the best performance on graphs with any average degree. This trait also holds across graph sizes: OMEGA performs best on small graphs where the scratchpads can hold a valuable fraction of the vertex data, while GraphPIM works best on large non-power-law graphs. Once again, the proposed computer memory architecture delivers high performance across the entire graph-size range. Additionally, note how the proposed computer memory architecture performs best with algorithms that are dominated by a high density of vertex access—where the proposed computer memory architecture can offer benefit—such as PR, which processes all vertices during each iteration. In contrast, TC and KC are more compute-intensive, and thus attain a lower speedup.

The proposed computer memory architecture's high performance benefit is mainly due to its computing 100% of atomic operations in on-/off-chip memory units. GraphPIM achieves the same goal by executing atomic operations in off-chip memory, but at the cost of generating high internal memory traffic, as discussed below. In contrast, OMEGA computes only a fraction of atomic operations in on-chip memory: up to 20% for non-power-law graphs and 74% for power-law graphs.

Figure 9:
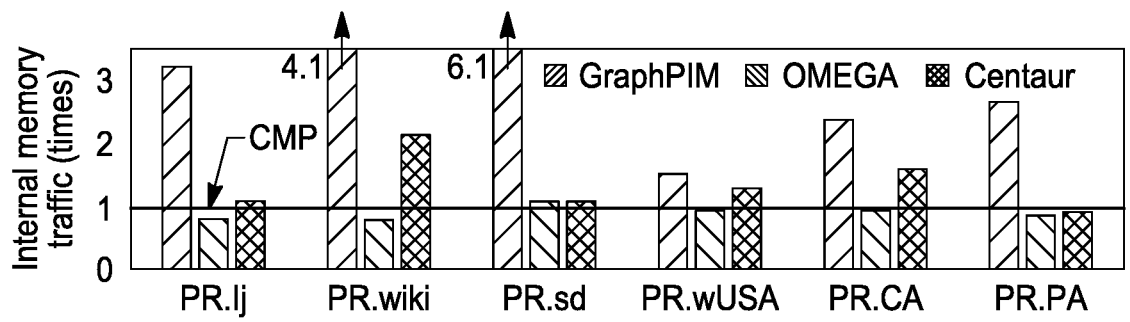
FIG. 9 is a graph showing internal off-chip memory traffic analysis.
Figure 10:
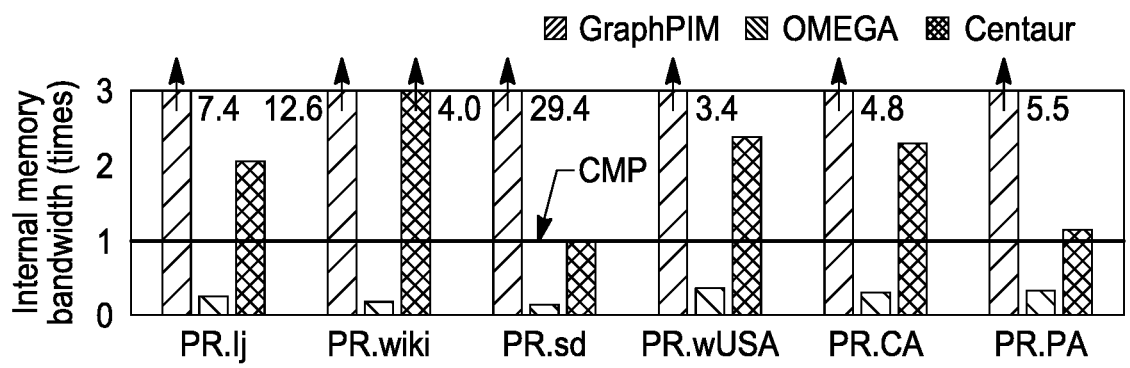
FIG. 10 is a graph showing internal-off-chip memory bandwidth utilization.

GraphPIM's main drawback is that it incurs a large amount of traffic between the $O_{ff}$ACUs and their associated memory partitions, as the $O_{ff}$ACUs generate two memory requests (one read and one write), both at a cache line granularity, for each atomic operation. FIG. 9 shows this traffic, indicating a 4.7× increase over a baseline CMP, on average. The proposed computer memory architecture limits the read/write requests to low-degree vertices, reducing the traffic to 1.3× of the baseline CMP, on average. Because of these transfers, which are related to atomic operations, both solutions attain high internal bandwidth utilization, 10.5× for GraphPIM, and 2.1× for the proposed computer memory architecture, over the baseline CMP, as reported in FIG. 10. In contrast, the other two solutions considered, the CMP and OMEGA, have much lower utilization as their cores are suspended during the execution of atomic operations. Note that the proposed computer memory architecture's traffic could be further reduced by enabling the $O_{ff}$ACUs to access their associated memory partitions at a word-granularity.

An analysis was also conducted of the impact of read/write buffers in the proposed computer memory architecture. It was found that read buffers moderately improve the speedup of PR over all our datasets from an average of 2.6× to 2.8×, and write buffers further improve it further to an average of 3.0×.

Figure 11:
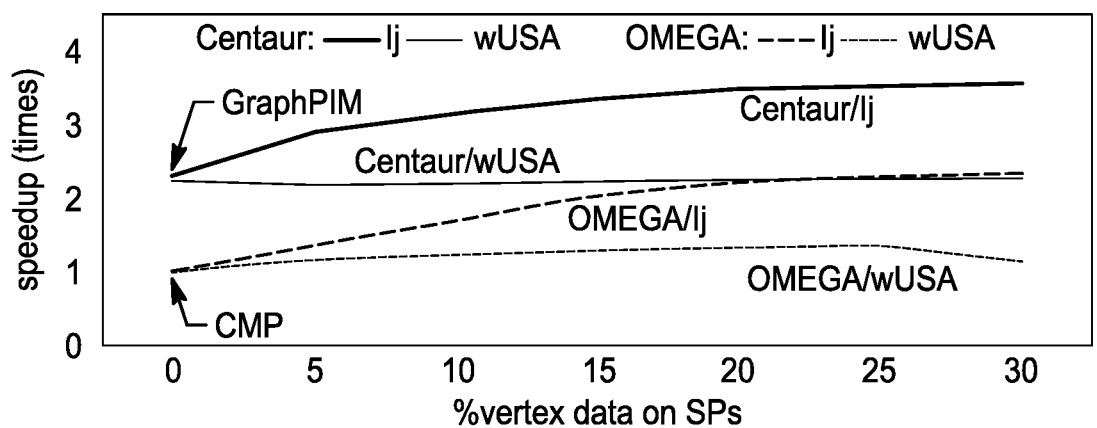
FIG. 11 is a graph showing scratchpad sensitivity analysis for the PageRank graph algorithm.

FIG. 11 compares trends in performance speedup as we sweep the scratchpad size in the proposed computer memory architecture and OMEGA, while keeping the total scratchpad plus shared L2 cache size similar to the shared L2 cache size of the baseline CMP and GraphPIM. Note that larger scratchpads correspond to speedup increases for a power-law graph, like lj, while this correlation is absent for a graph that does not follow the power-law, as is wUSA.

Figure 12:
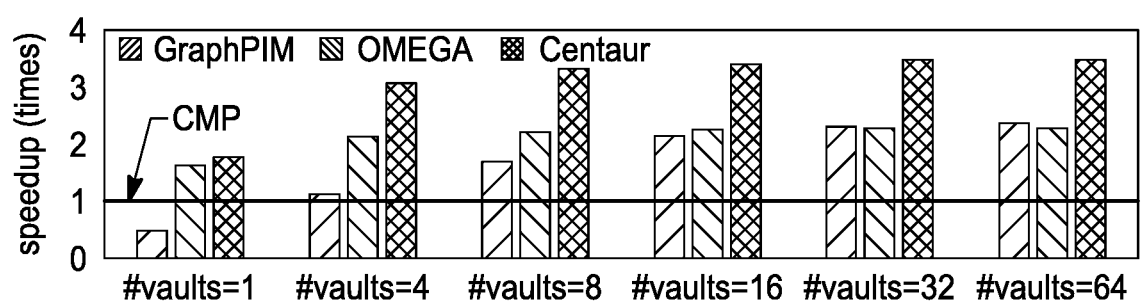
FIG. 12 is a graph showing sensitivity to the number of vaults.

FIG. 12 evaluates the speedup attained when varying the number of vaults and, correspondingly, the number of $O_{ff}$ACUs and the off-chip bandwidth available. As shown, the proposed computer memory architecture presents the best performance consistently across the spectrum of setups considered.

As used herein, the term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer system for analyzing a graph, comprising:
   a plurality of computer processor nodes interconnected together and residing on a microchip, such that each of the computer processor nodes includes a core processor, a cache memory, a secondary memory, and an atomic compute unit; and
   one or more off-chip memory modules accessible to the plurality of computer processor nodes;
   wherein data related to high-degree vertices of a graph are stored in the secondary memory of the plurality of computer processor nodes and data related to low-degree vertices of the graph are stored in the one or more off-chip memory modules, where the high-degree vertices are a subset of vertices in the graph and the low-degree vertices are the remainder of vertices in the graph, such that the high-degree vertices individually have more edges than the low-degree vertices;
   atomic operations updating data stored at the high-degree vertices are performed by an atomic compute unit associated with the respective computer processor node where the data related to the high-degree vertices is stored, and atomic operations updating data stored at the low-degree vertices are performed by an atomic compute unit associated with the respective off-chip memory module where the data related to the low-degree vertices is stored.

2. The computer system of claim 1 wherein high-degree vertices are chosen from the graph such that data related to the high-degree vertices fits in space of the memory on the plurality of computer processor nodes.

3. The computer system of claim 1 wherein each of the one or more off-chip memory modules further includes an off-chip vertex management unit configured to receive data requests from the computer processor nodes and manages the atomic operations embodied in the data requests.

4. The computer system of claim 1 wherein each of the computer processor nodes further includes an on-chip vertex management unit interfaced with the core processor, the cache memory, the secondary memory, the atomic compute unit and the off-chip memories, wherein the on-chip vertex management unit is configured to receive data requests and route the data requests to one of the secondary memory or one of the off-chip memories.

5. The computer system of claim 4 wherein the graph is processed by a graph algorithm executed by core processors of the plurality of computer processor nodes, and the on-chip vertex management unit updates a list of vertices in accordance with the graph algorithm, where the vertices in the list of vertices are active in next iteration of the graph algorithm.

6. The computer system of claim 1 wherein each of the one or more off-chip memory modules includes an atomic operations compute unit, a memory controller, and a memory, wherein data related to low-degree vertices is stored in the memory and the atomic operations pertaining to said data is performed by the atomic compute unit.

7. The computer system of claim 1 wherein vertices in the graph represent web pages and edges in the graph represent hyperlinks.

8. The computer system of claim 1 wherein the one or more off-chip memory modules are connected via a serial communication link to the plurality of computer processor nodes.

9. A computer system for analyzing a graph, comprising:
   a plurality of computer processor nodes interconnected together and integrated onto a single integrated circuit; wherein each computer processor node in the plurality of computer processor nodes includes a core processor, a cache memory, a scratchpad memory, and an atomic operations compute unit; and
   one or more off-chip memory modules physically separated from the integrated circuit and accessible to the plurality of computer processor nodes, wherein each of the one or more off-chip memory modules includes an atomic compute unit, a memory controller, and a memory;
   wherein data related to high-degree vertices of a graph are stored in the scratchpad memory and data related to low-degree vertices of the graph are stored in the memory of the one or more off-chip memory modules, such that vertices in the graph are ordered in descending order from vertices with most number of edges to vertices with least number of edges and a subset of the vertices having the most number of edges are the high-degree vertices and the remainder of the vertices in the graph are low-degree vertices,
   wherein atomic operations pertaining to the high-degree vertices are performed by an atomic compute unit of a respective computer processor node where the data related to the high-degree vertices is stored.

10. The computer system of claim 9 wherein the one or more off-chip memory modules are implemented as a three-dimensional random access memory interface.

11. The computer system of claim 9 wherein vertices in the subset of vertices are chosen from the graph such that data related to the high-degree vertices fits in space of the memory on the plurality of computer processor nodes.

12. The computer system of claim 9 wherein the one or more off-chip memory modules are connected via a serial communication link to the plurality of computer processor nodes.

13. The computer system of claim 9 wherein each of the computer processor nodes further includes an on-chip vertex management unit interfaced with the core processor, the cache memory, the secondary memory, and the atomic compute unit, wherein the on-chip vertex management unit is configured to receive a given data request, compare the given data request against a directory and route the given data request to one of the secondary memory or one of the off-chip memory modules, where entries in the directory include an identifier for a given vertex and a location of storage for the given vertex.

14. The computer system of claim 13 wherein the graph is processed by a graph algorithm executed by core processors of the plurality of computer processor nodes, and the on-chip vertex management unit updates a list of vertices in accordance with the graph algorithm, where the vertices in the list of vertices are active in next iteration of the graph algorithm.

15. The computer system of claim 14 wherein each of the one or more off-chip memory modules further includes an off-chip vertex management unit is configured to receive data requests from the computer processor nodes and manages the atomic operations embodied in the data requests.

* * * * *